May 29, 1945.　　　A. F. McNISH　　　2,376,928
GLASS FORMING MACHINE
Filed July 19, 1941　　　2 Sheets-Sheet 1
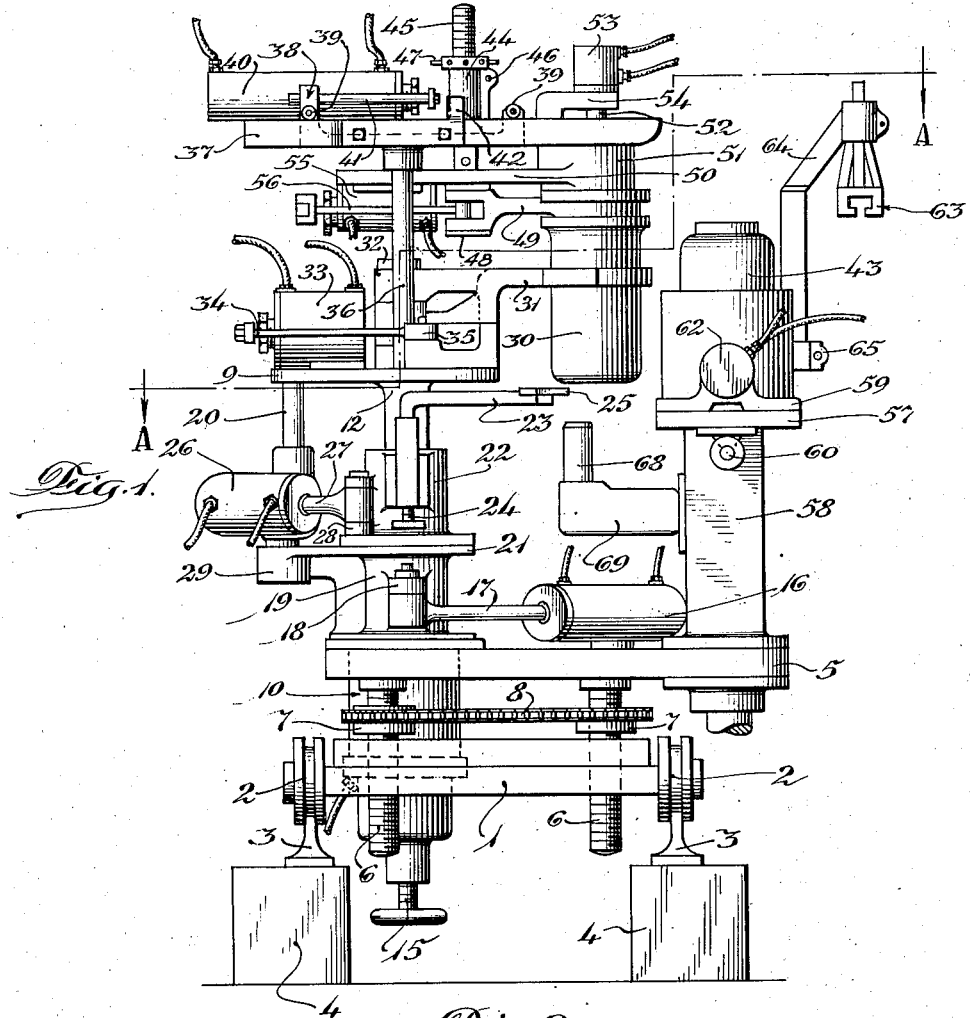
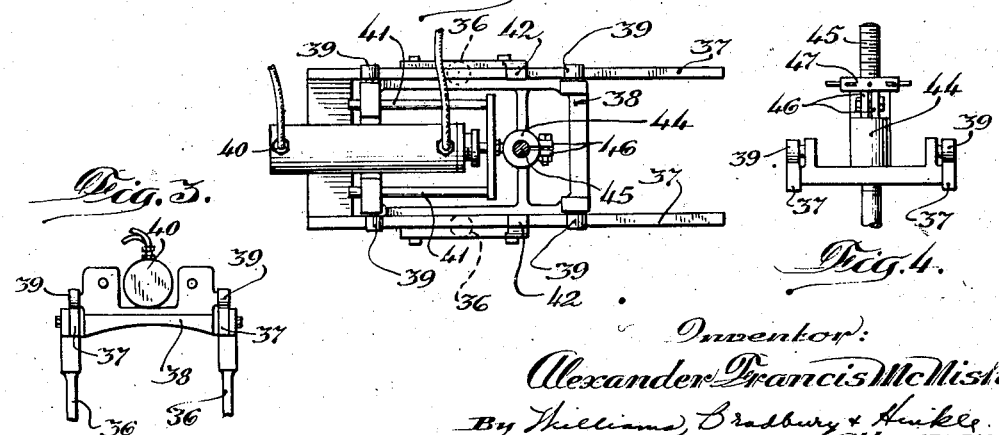
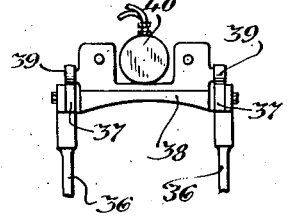
Inventor:
Alexander Francis McNish
By Williams, Bradbury & Hinkle
Attorneys May 29, 1945.　　　A. F. McNISH　　　2,376,928
GLASS FORMING MACHINE
Filed July 19, 1941　　　2 Sheets-Sheet 2
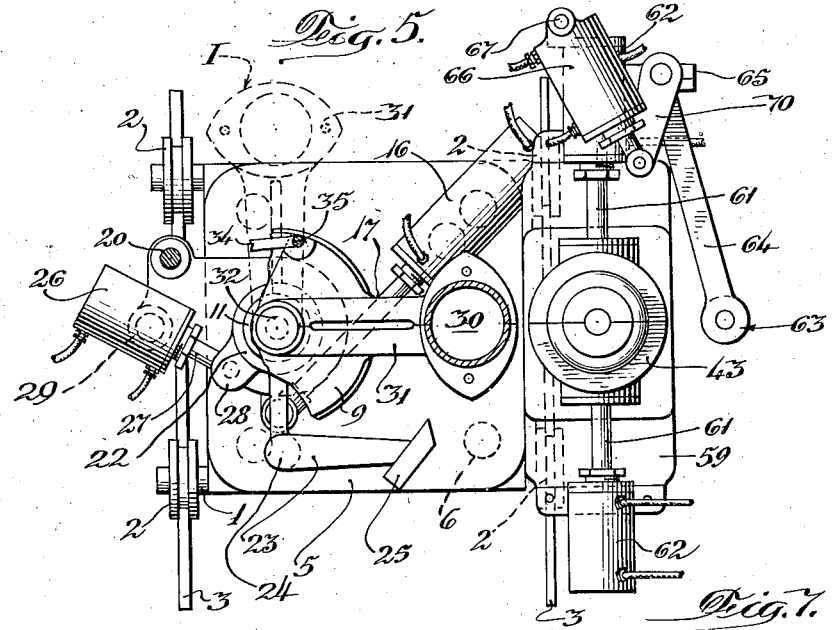
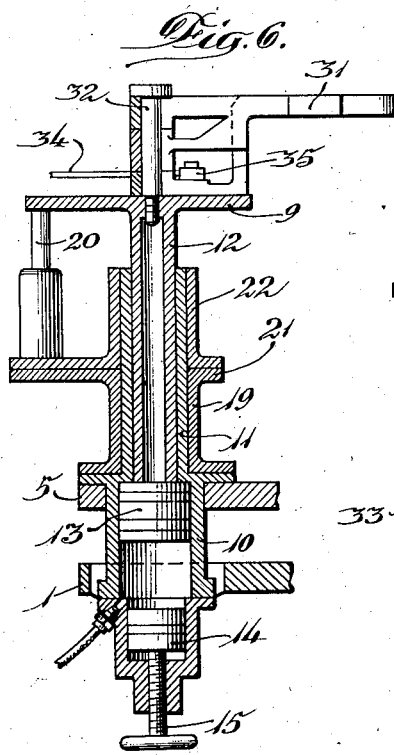
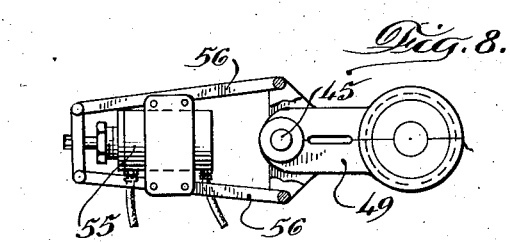
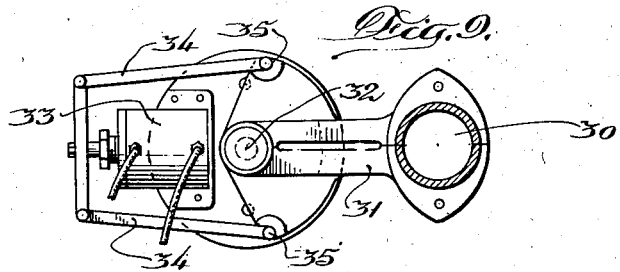
Inventor:
Alexander Francis McNish
By Williams, Bradbury & Hinkle
Attorneys Patented May 29, 1945

2,376,928

UNITED STATES PATENT OFFICE 2,376,928

GLASS FORMING MACHINE

Alexander Francis McNish, Scone, Scotland, assignor of one-half to John Moncrieff Limited, Perth, Scotland Application July 19, 1941, Serial No. 403,125
In Great Britain August 12, 1940

8 Claims. (Cl. 49—5)

This invention relates to automatic glass forming machines for the manufacture of glass bottles and like glass hollow ware of the kind which gather the molten glass by suction into a parison mold and transfer a parison of glass to a finishing mold in which the glass is blown and formed to shape.

The invention is concerned with machines as aforesaid which are provided with a single set of molds and which are hereinafter for brevity termed "single-unit machines" as distinct from multiple machines provided with a plurality of sets of molds adapted to simultaneously produce a plurality of bottles.

It is one of the objects of the present invention to provide an automatic single-unit machine which can easily be moved about and manipulated to enable it to be brought quickly into use for the production of bottles or like glass-ware in relatively small quantities when the use of a larger machine would not be economical.

It is a further object of the invention to produce a machine according to the last preceding paragraph which will be of relatively small size as compared with the large machines commonly used. The relatively small size of the machine according to the present invention not only makes it easier to move about from place to place, but also enables a plurality of such machines to be brought into use in front of a common glass furnace having a plurality of gathering basins, one for each forming machine in use.

Other objects and advantages of the machine according to the present invention will be manifest from the description hereinafter given.

According to the present invention a single-unit glass forming machine of the kind aforesaid comprising the usual divided parison mold, the halves of which are carried by hinged or pivoted jaws, has the parison mold mounted to swing in a horizontal plane about the centre of the hinge or pivot of the parison mold jaws to move the parison mold in a curvilinear path from the gathering position to the transfer position and conversely. In consequence thereof, the parison mold travels in a curved path of comparatively short radius, thus reducing the dimensions of the machine.

It may be explained that, in single-unit glass forming machines of the kind aforesaid, it is usual for a divided parison mold to be carried by a pair of hinged or pivoted arms mounted at the end of a relatively long carrying arm which is caused to oscillate in a horizontal plane to move the parison mold in a curved path, the radius of which is equal or nearly equal to the length of the carrying arm, plus the length of the hinged or pivoted arms, with the result that the size of the machine is greater and the time taken for the parison to travel from the gathering position to the transfer position is longer than that required in a machine according to the present invention.

As is usual, the parison molds swings in an arc which is preferably about 90 degrees and according to the present invention the finishing mold is placed just outside the path of travel of the parison mold at the transfer position, so that the parison mold can be opened and the parison of glass, supported by the usual neck mold, can be given a short outward radial motion, to place the parison in the finishing mold.

It will be understood that, as is usual in machines of the kind aforesaid, the parison mold and neck mold are vertically reciprocated at the gathering position to lower and lift the parison mold out of the glass.

By virtue of the fact that the finishing mold is placed just sufficiently outside the path of travel of the parison mold to permit the latter to be opened at the transfer position, the finishing mold is situated at a distance from the centre of the hinge or pivot of the parison mold jaws only slightly greater than the radius of the path of travel of the parison mold, with the result that the finishing mold is brought comparatively close to the centre of motion and the machine is therefore of comparatively small dimensions not only in the direction out from the furnace, but also in the lateral direction. This will be appreciated when it is explained that the radius of the path of travel of the parison mold, which is determined by the length of the parison mold jaws, may be in the region of twelve inches or thereabouts.

The machine is equipped with mechanism for traversing the parison mold in its curved path with the neck mold, for raising and lowering the two molds, for rectilinear motion of the neck mold at the transfer position and for indenting and blowing the parison in the finishing mold, as well as with mechanism for opening and closing the molds, for shearing the string of glass from the parison at the gathering position and for removing the finished article from the finishing mold.

The machine is also provided with means for cooling the parison mold when opened and with adjusting means for enabling the machine to be adapted to the manufacture of different sizes of bottles, all of which features will be briefly mentioned in the following more detailed description, reference being made to the accompanying drawings which illustrate a glass forming machine according to the invention.

On the drawings Fig. 1 is a view of the machine in side elevation. Fig. 2 is a plan view of the neck mold traversing gear positioned at the top of the machine shown in Fig. 1. Figs. 3 and 4 are end views looking on opposite ends of the parts shown in Fig. 2. Fig. 5 is a sectional plan view of the machine taken on the zig-zag line A—A of Fig. 1. Fig. 6 is a vertical sectional view of the parison mold table and its supporting structure. Figs. 7, 8 and 9 are plan views of the blowhead holder, neck mold holder and parison mold holder respectively.

The machine illustrated comprises a carriage 1 mounted in known manner on wheels 2 adapted to run on rails 3 fixed to foundation beams 4. The carriage 1 supports a base member or bedplate 5 vertically adjustable upon the carriage 1 in known manner by the provision beneath the bed-plate 5 of vertical screws 6 which work through nuts 7 formed as sprocket wheels and geared together by a chain 8. Mounted upon the bed-plate 5 is a parison mold table 9 guided for vertical rising and falling movement and adapted to be oscillated about its centre. For this purpose the bed-plate 5 is apertured and into the aperture is fitted a jacking cylinder 10 which is unitary with a vertical hollow post 11. Through the hollow post 11 there extends a hollow spindle 12 which depends from the parison mold table 9, the lower end of the spindle 12 being adapted to abut against the upper end face of a piston 13 movable in the jacking cylinder 10. The piston 13 is adapted to be operated by the admission of compressed air to the cylinder 10 to raise the spindle 12 and parison mold table 9, which descends by its own weight when the compressed air is permitted to escape from the cylinder 10. An auxiliary piston or movable abutment 14 is provided beneath the piston 13 to enable the descent of the piston 13 and consequently of the parison mold table 9 to be varied to suit different levels of glass in the furnace forehearth or gathering basin. The height of the piston or abutment 14 is regulated by an adjusting screw 15. The means for oscillating the parison mold table 9 and its connected parts comprise a horizontal cylinder 16 pivotally mounted on the bed-plate 5, a piston in the cylinder 16 being operated by compressed air and operating through a piston rod 17 on an arm 18 which projects from a drive sleeve 19 rotatable upon the post 11. The drive sleeve 19 rests on the bed-plate 5 and is connected to the parison mold table 9 by one or more telescopic vertical guides 20 which also serve to steady the table 9 during its rising and falling movements. The top of the drive sleeve 19 is formed as a face plate 21 and on this face plate is mounted a second drive sleeve 22 rotatable on the post 11. The drive sleeve 22 supports a shear arm 23 which is vertically adjustable on the sleeve 22, adjustment being effected by a screw 24. The shear arm 23 carries a shearing knife 25 which is oscillated about the centre of the spindle 12 when the drive sleeve 22 is oscillated by reciprocation of a piston in a cylinder 26, the piston rod 27 of which is connected to an arm 28 on the sleeve 22. The cylinder 26 is pivotally mounted on a lug 29 projecting from the drive sleeve 19 and face plate 21. Reciprocation of the piston in the cylinder 26 is effected in known manner by the controlled supply of compressed air to the cylinder 26.

The usual divided parison mold 30 is supported by a pair of pivoted or hinged mold jaws 31 and according to the present invention the hinge or pivot of the parison mold jaws 31 is arranged coaxially over the centre of oscillation of the table 9. This is effected by hinging the parison mold jaws 31 on a pivot pin 32 screwed into or otherwise secured centrally upon the table 9. A compressed-air or other fluid-pressure cylinder 33 mounted on the table 9 has its piston connected by a pair of links 34 to bosses 35 on sectors which form extensions of the parison mold jaws 31, so that reciprocation of the piston in the cylinder 33 effects opening and closing of the jaws 31 and parison mold 30. Timing mechanism not shown on the drawings serves to control the supply of compressed air or other pressure fluid to the cylinders 16, 26 and 33 and thus to actuate the several pistons therein in order to effect the desired operations of oscillation of the table 9, opening and closing of the parison mold 30 and oscillation of the shearing knife 25 in proper sequence.

Mounted above the table 9 upon vertical pillars or other suitable supports 36 is a horizontal track frame comprising parallel rails 37 on which travels a horizontally movable transfer member or slide 38 having rollers 39 which run on the rails 37. Fixed on the track frame between the rails 37 is a compressed-air cylinder 40, the piston of which is connected by a pair of rods 41 to the slide 38. Inward movement of the piston in the cylinder 40 limits movement of the slide 38 in one direction and its movement in the other direction is limited by the abutment of one of the rollers 39 against an abutment or stop 42 adjustably fixed to one of the rails 37. The slide 38 supports transfer mechanism for transferring the parison of glass from the parison mold 30 to a finishing mold 43, for which purpose there is mounted on the slide 38 a sleeve 44 through which passes a vertical screw 45. The sleeve 44 is split and provided with clamping jaws 46 so that the screw 45 can be clamped in the sleeve 44. A nut 47 is threaded on the screw 45 and can be turned to adjust the height of the screw before clamping it in the sleeve 44. The screw 45 has a head 48 at its lower end and serves as a support and hinge pin for a pair of neck mold arms 49 which support the usual neck ring mold whereby the parison of glass is suspended in the parison mold 30. Secured or pinned to the screw 45 above the neck mold arms 49 is a blow head holder 50 which carries at its outer end the usual suction and blow head 51 in which works the usual indenting plunger 52 for indenting the neck of the parison. The plunger 52 is lifted and lowered by connection to a piston in a compressed-air or other fluid-pressure cylinder 53 supported on the blow head holder 50 by a bracket 54 which may be hollow and serve as a suction and blow passage from the cylinder 53 to the blow head 51. Bolted or otherwise secured to the underside of the blow head holder 50 is a compressed-air or other fluid-pressure cylinder 55, the piston in which is connected by a pair of rods 56 to the neck mold arms 49. The cylinders 40, 53 and 55 are supplied by pipes with compressed-air or other pressure fluid from timing mechanism arranged to control the pressure fluid supply so as to effect the desired operations in proper sequence of raising and lowering the plunger 52, applying suction and pressure fluid to the suction and blow head 51, traversing of the slide 38 on the rails 37 and opening and closing of the neck mold arms 49. It will also be apparent that by adjustment of the screw 45 in the sleeve 44 the neck mold, plunger and blow head and their associated parts are vertically adjustable to suit different sizes of bottle molds 30.

The finishing mold 43 is in two halves slidable towards and away from each other on a finishing mold table 57 supported on a bracket 58 on the bed-plate 5. The slide 59 which carries the two halves of the finishing mold 43 is adjustable on the table 57 by the provision of a slide adjusting screw 60 to enable the finishing mold 43 to be correctly centered to receive the parison. The two halves of the finishing mold 43 are connected to the piston rods 61 of a pair of opposed compressed-air cylinders 62 mounted on the slide 59 and it will be apparent that the supply of compressed-air to the cylinders 62 will effect the opening and closing of the finishing mold.

To remove the finished bottle, take-off mechanism 63 of any known form is provided for gripping and releasing the neck of the bottle, this mechanism being carried at the end of an arm 64 pivotally mounted in a bracket 65 on the slide 59. The arm 64 is adapted to be oscillated to remove the finished bottle from the finishing mold and for this purpose a lever 70 projecting from the arm 64 is actuated by the piston rod of a cylinder 66 pivotally mounted at 67 on the slide 59. The supply of compressed-air to the cylinder 66 by means not shown effects oscillation of the arm 64.

A pair of cooling jets 68 project upwards from hollow brackets 69 secured to the side of the finishing mold supporting bracket 58 and the jets 68 are positioned to direct cooling jets of air on to the halves of the parison mold 30 when the latter is open opposite the finishing mold.

The machine operates as follows:

Under the control of the cylinder 16, the drive sleeve 19 is oscillated about the fixed central column or hollow post 11. By reason of the driving connection between the parison mold table and the base plate 21 of the drive sleeve 19, this driving connection being effected by the telescopic vertical guides 20, the parison mold table 9 oscillates about its centre, carrying with it the parison mold 30, the shear knife 25 and the whole of the mechanism mounted above the table 9, including the horizontal rails 37, the slide 38, the neck mold arms 49, the blow head 51 and their actuating mechanisms. The parison mold table 9 and its connected parts swing through an arc of preferably 90 degrees from a gathering position indicated by the position of the parison mold arms 31 in dotted lines at I in Fig. 5 to the position shown in full lines in Fig. 5 and vice versa, the position shown in full lines in Fig. 5 representing the transfer position. When the parison mold arms 31 are in the dotted position shown at I in Fig. 5, the escape of compressed-air supplied to the jacking cylinder 10 causes the jacking piston 13 to descend, thereby allowing the table 9 and its connected parts to fall by their own weight until the piston 13 is arrested in its downward movement by the adjustable abutment 14. The parison mold 30 is thus caused to descend at the gathering position into the gathering basin of the forehearth (not shown) of the glass furnace. While the parison mold 30 is in the gathering basin suction is applied to the blow head 51 to induce a charge of glass into the parison mold. The parison mold table 9 is then raised by the admission of compressed-air to the jacking cylinder 10 to raise the piston 13, thereby raising the parison mold out of the gathering basin. The cylinder 26 then operates to oscillate the shear knife 25 to cut-off the string of glass from the mold 30. Thereupon the parison mold table 9 and its associated parts commence their arcuate travel to move the parison mold from the position I to the transfer position shown in full lines at Fig. 5.

Immediately after the shear knife 25 cuts off the string of glass from the parison mold 30, the suction from the blow head 51 is cut off, and at the same time the cylinder 53 is operated to withdraw the plunger 52 leaving an indent in the neck of the parison for the initial blowing thereof, which takes place before the shear knife 25 is withdrawn and before the parison mold 30 is opened.

The parison mold 30 is moved as rapidly as possible from the gathering position to the transfer position, so as to enable the gathering opening in the forehearth to be closed or partially closed as soon as possible.

When the parison in the mold 30 is sufficiently cooled at the transfer position, compressed air is admitted to the cylinder 33 to open the parison mold 30. At or about the same time, compressed air is admitted to the cylinders 62 to open the finishing mold 43, and the take-off mechanism 63 is operated to close the jaws thereof upon the neck of the previously finished bottle which up to now has been held in the finishing mold 43. Immediately after the opening of the parison and finishing molds, compressed air is admitted to the cylinder 40 to cause the slide 38 to travel outwardly along the rails 37, traveling from the parison mold position to the finishing mold position. At the same time, compressed air is admitted to the cylinder 66 causing the take-off arm 64 to oscillate and thus moving the take-off mechanism 63 outwardly with the previously finished article.

When the blow head 51 reaches the center of the finishing mold 43 the parison is held suspended from the neck mold and air is admitted to the cylinders 62 to close the finishing mold 43, and the jaws of the take-off mechanism 63 are opened, thus releasing the previously finished article.

The parison is allowed sufficient time in the finishing mold to permit the glass to stretch to the mold bottom, whereupon compressed air is admitted to the blow head 51 for the final blowing of the article. During the final blowing operation and while the parison mold 30 remains open at the transfer position, the halves thereof are cooled by streams of air from the cooling jets 68.

When the final blowing of the article is completed, compressed air is admitted to the cylinder 55 to effect opening of the neck mold arms 49. Then the compressed air supply to the cylinder 40 is reversed, thus retracting the slide 38 with the blow head 51, neck mold arms 49, and associated parts; and at the same time the reversal of the compressed air supply to the cylinder 66 returns the take-off arm 64 to its original position. When the slide 38 has been retracted the parison mold table 9 begins its return oscillation, thus returning the parison mold 30 and associated parts to the gathering position. During this travel from the transfer position to the gathering position compressed air is supplied to the cylinders 33 and 55 to effect the closing of the parison mold 30 and neck mold arms 49 before the return oscillation has been completed.

The speed of operation of the machine necessarily will be varied according to the size of bottle to be blown, in order to allow sufficient time for the cooling of the parison in its travel from the gathering position to the finishing mold and in order to allow a sufficient time for final blowing of the parison in the finishing mold. It will be appreciated that the machine may be adjusted to various sizes of bottle by vertical adjustment of the screw 45 which supports the neck mold arms 49 and the blow head 51 and as the level of the glass in the furnace forehearth or gathering basin falls, the vertical stroke of the parison mold table 9 may be adjusted by adjustment of the position of the jacking piston abutment 14.

The machine can be readily converted from clockwise to anti-clockwise movement or vice-versa, that is to say, if the parison mold is adapted to move in a clockwise direction as shown, during its working stroke from the gathering to the transfer position, it can be reversed so as to work in the opposite direction, all that is necessary being slight modification of the shearing arm 23 and its operating gear. Consequently, the machine can be made to work either right-handed or left-handed in front of a furnace forehearth. This is an advantage when two or more such machines gather from the same furnace, each from its own gathering basin or forehearth, such as the forehearth described and claimed in my prior Patent No. 1,816,982 wherein the molten glass circulates in one direction through the forehearth. If two or more such forehearths are arranged adjacent each other, it is desirable that the molten glass circulated in one forehearth should move in the opposite direction to that flowing through the next adjacent forehearth, so that the forehearths do not draw cool glass from one another. As the string of glass sheared from the parison mould at the gathering position should follow the flow of glass in the forehearth, it is desirable that the parison mold, when it leaves the gathering position, should move in the same direction as the glass flowing in the forehearth from which the gather has been made; consequently adjacent machines should be arranged to work right-handed and left-handed respectively and this can readily be effected in the manner before stated.

I claim:

1. A glass forming machine of the suction gathering type comprising a bed-plate, an oscillatory member rotatably mounted on said bed-plate by a vertical support means providing a vertical axis of rotation, means for periodically oscillating said member, means for periodically raising and lowering said member at a gathering position, a pair of parison mold carrying arms hinged or pivoted together with the center of pivotal movement on a vertical axis coincident with the aforesaid vertical axis, means carried by said member for actuating said arms to open and close a divided parison mold carried thereby, horizontal guides carried by and supported above the said member and radially directed with respect to the vertical axis, a rectilinearly movable slide guided by said guides, a neck mold holder and actuating means therefor carried by said slide, a blow head carried by said slide, a finishing mold and actuating means therefor carried by said bed-plate, and means for reciprocating the said slide, whereby the oscillating means positions the parison mold adjacent said finishing mold, said arm actuating means opens the parison mold and said slide is moved on said guides by said reciprocating means.

2. A machine according to claim 1 including a shear member and means mounted upon the oscillatory member for actuating the said shear member.

3. A glass forming machine of the suction gathering type comprising a bed-plate, an oscillatory table above said bed-plate and having a spindle depending therefrom, a sleeve guide on said bed-plate for receiving said spindle, a jacking cylinder carried by said bed-plate, a piston reciprocable in said cylinder by fluid pressure, said piston being adapted to lift said spindle and table when the piston rises and to permit said table and spindle to descend when the piston moves downwards, means carried by said bed-plate for oscillating said table about the axis of the spindle, a pair of parison mold carrying arms hinged or pivoted together on a vertical axis substantially coincident with the axis of the spindle, means carried by said table for actuating said arms to open and close a divided parison mold carried thereby, horizontal guides carried by and supported above said table and radially directed with respect to a vertical axis coincident with the axis of the spindle, a rectilinearly movable slide guided by said guides, a neck mold holder and actuating means therefor carried by said slide, a blow head carried by said slide, a finishing mold and actuating means therefor carried by said bed-plate, and means for reciprocating said slide, whereby the oscillating means positions the parison mold adjacent said finishing mold, said arm actuating means opens the parison mold, and said slide is moved on said guides by said reciprocating means.

4. A glass forming machine of the suction gathering type comprising a bed-plate, an oscillatory table mounted upon said bed-plate for oscillation about a vertical support means providing a vertical axis, means for periodically raising and lowering said table at a gathering position, a pair of parison mold carrying arms hinged or pivoted together on a vertical axis coincident with the axis of oscillation of said table, fluid-pressure operated cylinder and piston mechanism carried by said table for opening and closing said arms, a drive bracket between the bed-plate and the table and oscillatory about the axis of oscillation of said table, a telescopic driving connection between the drive bracket and the table to permit rising and falling movement of the table, means for oscillating said bracket, thereby to oscillate the table and the parison mold carrying arms, a shear having a pivotal mounting adapted to oscillate with the drive bracket and table, fluid-pressure operated cylinder and piston mechanism carried by the drive bracket for actuating the shear, and a neck mold and actuating means therefor carried by the said table.

5. A glass forming machine of the suction gathering type comprising a bed-plate, an oscillatory table mounted on said bed-plate, means for oscillating said table about a vertical support means providing a vertical axis of oscillation, means for periodically raising and lowering said table, a pair of parison mold carrying arms hinged or pivoted together on a vertical axis coincident with the axis of oscillation of said table, means carried by said table for actuating said arms to open and close a divided parison mold carried thereby, a horizontal track frame carried by and supported above said table, a rectilinearly movable transfer member mounted on said track frame and movable radially with respect to the axis of oscillation of said table, a divided finishing mold, means for opening and closing the finishing mold, means for reciprocating said transfer member when said oscillating means has positioned the parison mold adjacent said finishing mold and said arm actuating means has opened the parison mold, and a neck mold holder and blowhead carried by said transfer member.

6. A glass forming machine of the suction gathering type comprising an oscillatory table, means for oscillating said table about a vertical support means providing a vertical axis of oscillation, means for periodically raising and lowering said table, a pair of parison mold carrying arms hinged or pivoted together on a vertical axis coincident with the axis of oscillation of said table, means carried by said table for actuating said arms to open and close a divided parison mold carried thereby, a transfer member carried by and radially movable with respect to said table, a neck mold holder carried by said transfer member, a finishing mold holder, means for reciprocating said transfer member when said oscillating means has positioned the parison mold adjacent said finishing mold holder and said arm actuating means has opened the parison mold, and a pair of compressed air cooling jets positioned to direct cooling air jets upon the halves of the parison mold when open adjacent the finishing mold.

7. A glass forming machine of the suction gathering type comprising a bed-plate, an oscillatory member rotatably mounted on said bed-plate by a vertical support means providing a vertical axis of oscillation, means for periodically oscillating said member about the vertical axis, means for periodically raising and lowering said member at a gathering position, a pair of parison mold carrying arms hinged or pivoted together on a vertical axis coincident with the aforesaid vertical axis, means carried by said member for actuating said arms to open and close a divided parison mold carried thereby, horizontal guides carried by and supported above the said member and radially directed with respect to the said vertical axis, a rectilinearly movable slide guided by said guides, a neck mold holder and actuating means therefor carried by said slide, a blow head also carried by said slide, means for effecting vertical adjustment of the neck mold holder and its actuating means and of the blowhead with respect to said slide, a finishing mold and actuating means therefor carried by said bed-plate, and means for reciprocating the said slide, whereby the oscillating means positions the parison mold adjacent said finishing mold, said arm actuating means opens the parison mold, and said slide is moved on said guides by said reciprocating means.

8. A glass forming machine of the suction gathering type comprising a bed-plate, an oscillatory table above said bed-plate and having a spindle depending therefrom, a sleeve guide on said bed-plate for receiving said spindle, a jacking cylinder carried by said bed-plate having an opening to receive said spindle, a piston abutting the lower end of said spindle reciprocable in said cylinder by fluid pressure, said piston being adapted to lift said spindle and table when the piston rises and to permit said table and spindle to descend when the piston moves downwards, means carried by said bed-plate for oscillating said table about the axis of the spindle, a pair of parison mold carrying arms hinged or pivoted together on a vertical axis coincident with the axis of said spindle, means carried by said table for actuating said arms to open and close a divided parison mold carried thereby, a horizontal track carried by and supported above said table, a slide movable on said track in a direction radial with respect to the axis of oscillation of said table, means for reciprocating said slide on the track, a carrier adjustable vertically on said slide, and a neck mold holder and actuating means therefor mounted on said carrier.

ALEXANDER FRANCIS McNISH.